United States Patent
Duan et al.

(10) Patent No.: US 11,087,513 B1
(45) Date of Patent: Aug. 10, 2021

(54) REAL-TIME BOKEH EFFECT

(71) Applicant: Snap Inc., Santa Monica, CA (US)

(72) Inventors: Kun Duan, Los Angeles, CA (US); Nan Hu, San Jose, CA (US); Linjie Luo, Los Angeles, CA (US); Chongyang Ma, Los Angeles, CA (US); Guohui Wang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 126 days.

(21) Appl. No.: 16/186,164

(22) Filed: Nov. 9, 2018

Related U.S. Application Data

(60) Provisional application No. 62/635,889, filed on Feb. 27, 2018.

(51) Int. Cl.
| | | |
|---|---|---|
| *G06K 9/00* | (2006.01) | |
| *G06T 11/60* | (2006.01) | |
| *G06T 7/70* | (2017.01) | |
| *G06T 11/00* | (2006.01) | |
| *G06T 7/194* | (2017.01) | |

(52) U.S. Cl.
CPC .............. *G06T 11/60* (2013.01); *G06T 7/194* (2017.01); *G06T 7/70* (2017.01); *G06T 11/001* (2013.01); *G06T 2207/20081* (2013.01)

(58) Field of Classification Search
CPC ......... G06T 11/60; G06T 11/001; G06T 7/70; G06T 7/194; G06T 2207/20081
See application file for complete search history.

(56) References Cited

U.S. PATENT DOCUMENTS

| | | | | |
|---|---|---|---|---|
| 8,035,641 | B1* | 10/2011 | O'Donnell | G06T 15/00 345/420 |
| 8,830,381 | B2* | 9/2014 | Uehara | G06T 5/20 348/348 |
| 9,734,551 | B1* | 8/2017 | Esteban | G06T 5/002 |
| 9,858,649 | B2* | 1/2018 | Liang | G06T 7/11 |
| 10,666,851 | B2* | 5/2020 | Kikuchi | H04N 5/23229 |
| 2009/0002365 | A1* | 1/2009 | Kurabayashi | G06T 5/002 345/419 |
| 2013/0230243 | A1* | 9/2013 | Intwala | G06T 5/20 382/167 |
| 2014/0086486 | A1* | 3/2014 | Pillman | G06T 5/003 382/173 |
| 2014/0218550 | A1* | 8/2014 | Chuang | H04N 5/23229 348/208.6 |
| 2015/0178970 | A1* | 6/2015 | Pham | G06K 9/6256 382/190 |
| 2016/0093032 | A1* | 3/2016 | Lei | G06T 11/00 382/264 |

(Continued)

*Primary Examiner* — Solomon G Bezuayehu
(74) *Attorney, Agent, or Firm* — Schwegman Lundberg & Woessner, P.A.

(57) ABSTRACT

Systems and methods are provided for receiving an image from a camera of a mobile device, analyzing the image to determine a subject of the image, segmenting the subject of the image to generate a mask indicating an area of the image comprising the subject of the image, applying a bokeh effect to a background region of the image to generate a processed background region, generating an output image comprising the subject of the image and the processed background region, and causing the generated output image to display on a display of the mobile device.

20 Claims, 15 Drawing Sheets

(56) References Cited

U.S. PATENT DOCUMENTS

| | | | | |
|---|---|---|---|---|
| 2018/0007302 A1* | 1/2018 | Meixner | .................... | G06T 1/20 |
| 2018/0032797 A1* | 2/2018 | Lee | .................... | G06K 9/00221 |
| 2018/0350043 A1* | 12/2018 | Seely | ........................ | G06T 5/50 |
| 2019/0286054 A1* | 9/2019 | Kim | ...................... | G02B 27/126 |
| 2019/0295260 A1* | 9/2019 | Mehta | .................. | G06K 9/4628 |
| 2021/0073953 A1* | 3/2021 | Lee | ........................ | G06T 5/002 |

* cited by examiner

REAL-TIME BOKEH EFFECT

PRIORITY

This application is a continuation of and claims the benefit of priority of U.S. Patent Application Ser. No. 62/635,889, filed on Feb. 27, 2018, which is hereby incorporated by reference herein in its entirety.

BACKGROUND

A large portion of photographs taken using mobile devices (e.g., smartphones) are portraits, such as "selfies" taken of the users of the mobile devices themselves. Due to the intrinsic limitations enforced by price and portability of mobile devices, however, there is a huge gap in terms of quality between photographs taken by mobile device cameras and those taken by professional devices, such as digital single-lens reflex (DSLR) cameras. DSLR cameras are particularly good at portrait photography by capturing the subjects clearly with a blurry background, which makes the people "stand out" from the photo. This effect is referred to as "bokeh."

Bokeh is a popular photography effect that may be created using a very fast lens of a DSLR camera. Bokeh refers to blur or a blurry quality of a background of a subject in a photograph. For example, an object of a photograph, such as a butterfly, a tree, a person, or other object, may be in focus while the background of the object is blurred such that the object of the photograph stands out against the background. This effect makes for a pleasing aesthetic quality. Since a high-end lens with a wide-open aperture is necessary for producing the bokeh effect, a camera on a computing device, such as a mobile device, cannot produce the effect.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein enable DSLR-like portrait photography for mobile users. Example embodiments leverage machine learning techniques and the computation power of a graphics processing unit (GPU) to achieve automatic and real-time enhancement of a subject (e.g., a portrait or other object) taken by a mobile device (e.g., a smartphone or tablet camera).

As explained above, due to the limitations of the physical size of a lens on a mobile device, it is not possible to capture the same quality image with a blurred background as can be done with a professional DSLR camera. Example embodiments provide for systems and methods for mimicking the behavior of a high-end digital camera, on a mobile device. Moreover, since providing this effect on a mobile device is very computationally intensive, example embodiments provide a highly efficient way of building image processing using the GPU power of a mobile device to accelerate the processing to achieve the best results on the mobile device. In this way, example embodiments provide real-time (or near real-time) processing of an image or video to produce a bokeh effect.

Figure 1:
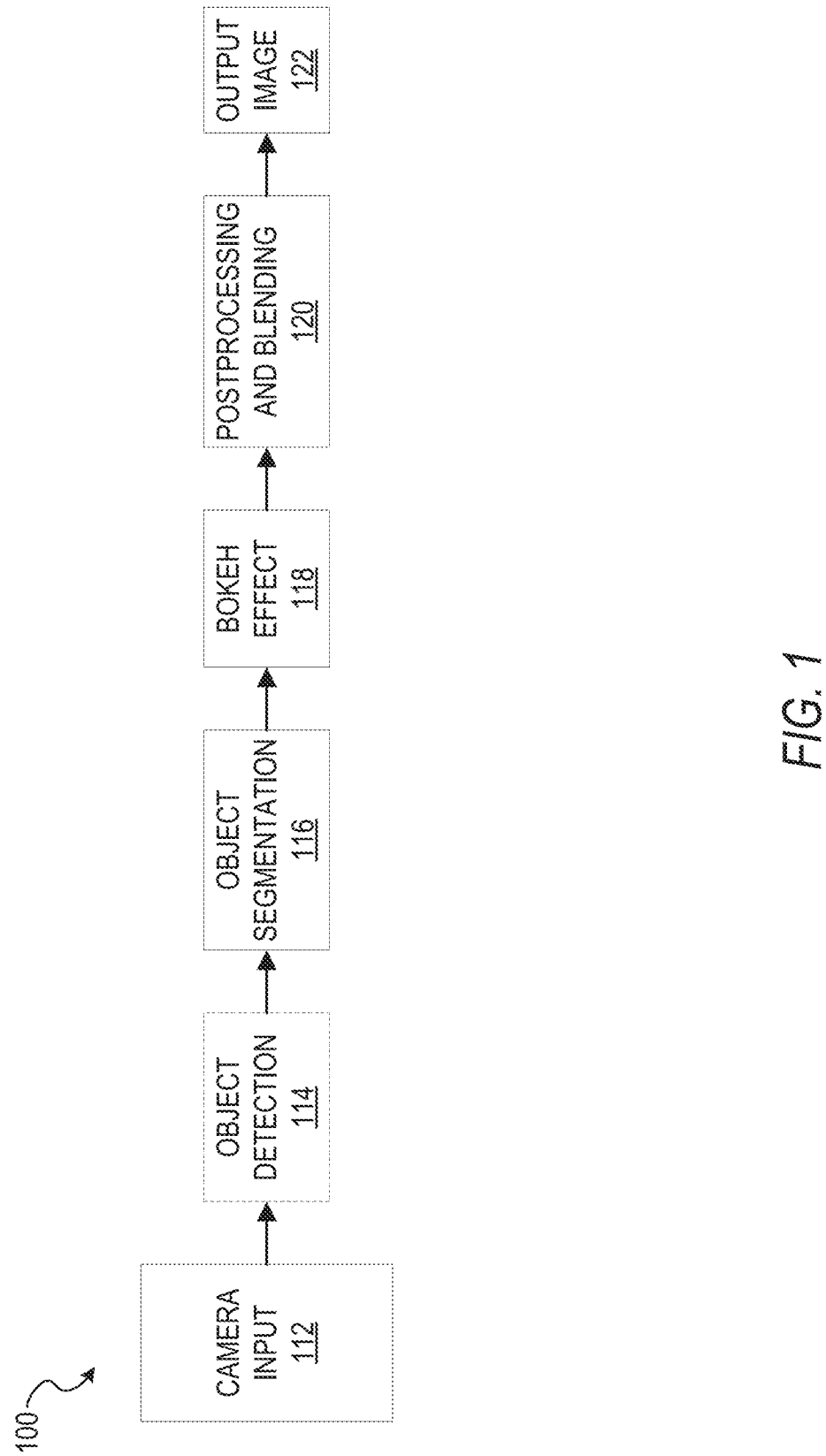
FIG. 1 is a block diagram illustrating a workflow of an automatic bokeh effect system, according to some example embodiments.

FIG. 1 is a block diagram 100 illustrating a workflow of an automatic bokeh effect system, according to some example embodiments. In the high-level workflow of block diagram 100, first a camera input data stream 112 (e.g., photograph or video) is optionally fed into an object detection 114 module. In one example embodiment, a bokeh effect system may want to detect that a particular object is present in the data stream before applying a bokeh effect on the image. To use an example, the bokeh effect system may want to detect that a face is present in the data stream before applying a bokeh effect on the image. In this example, if a particular object is detected, then object segmentation 116 is applied to generate a mask of the object. Continuing with the above example, the particular object may be a face and the object segmentation 116 may be a deep neural network (DNN) based portrait segmentation to generate a mask of a portrait including a person's hair, face, shoulder, and headwear. The bokeh effect 118 is applied to a background region of the data stream, any post-processing is applied, and the blurred background region is blended with the original portrait image, in operation 120. The generated image or output image 122 will give a visually plausible and natural look with bokeh blurred background. The output image 122 may be displayed on a mobile device to a user. Further details of the bokeh effect process are described below with respect to FIG. 3.

In example embodiments, a video may be processed to apply the bokeh effect frame by frame. Thus, the image of each frame of the video would be processed to apply the bokeh effect as explained below. In other example embodiments, key frames may be determined in the video and the bokeh effect may only be applied on key frames selected in the video; the gaps between key frames may be filled using a tracking algorithm. Example tracking algorithms include a feature point based object tracking algorithm and an optical flow algorithm. A mobile device would first apply the object segmentation and bokeh effect (as described below) on key frames. When a new frame is received, one or more tracking algorithms are applied on the previous key frame and the new frame, and a transformation matrix is generated which can warp the bokeh result from the key frame to a new output image for the new frame.

Figure 2:
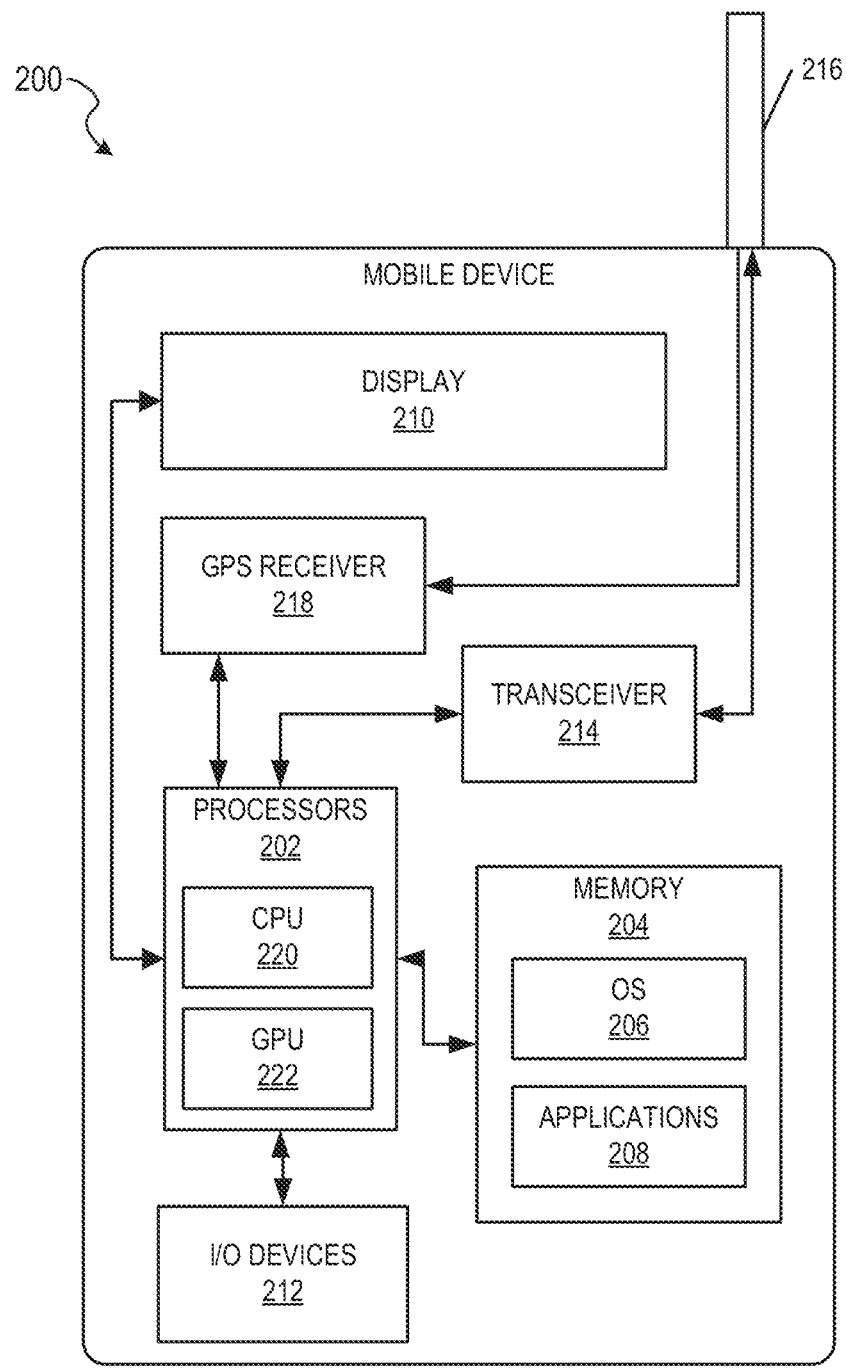
FIG. 2 illustrates an example mobile device, according to some example embodiments.

Aspects of the bokeh effect system may be implemented using a computing device such as the example mobile device 200 shown in FIG. 2. A mobile device is a portable computing device, such as a smartphone, tablet computer, personal digital assistant (PDA), or the like. The mobile device 200 may include one or more processors 202. The one or more processors 202 may be any of a variety of different types of commercially available processors 202 suitable for mobile devices (for example, an XScale architecture microprocessor, a microprocessor without interlocked pipeline stages (MIPS) architecture processor, or another type of processor). In example embodiments, the mobile device 200 may include a CPU 220 and a GPU 222.

A memory 204, such as a random access memory (RAM), a flash memory, or another type of memory, is typically accessible to the one or more processors 202. The memory 204 may be adapted to store an operating system (OS) 206, as well as applications 208, such as an image processing application that may provide image effects to a user, such as a bokeh effect. The one or more processors 202 may be coupled, either directly or via appropriate intermediary hardware, to a display 210 and to one or more input/output (I/O) devices 212, such as a keypad, a touch panel sensor, a microphone, and the like. Similarly, in some embodiments, the one or more processors 202 may be coupled to a transceiver 214 that interfaces with an antenna 216. The transceiver 214 may be configured to both transmit and receive cellular network signals, wireless data signals, or other types of signals via the antenna 216, depending on the nature of the mobile device 200. Further, in some configurations, a GPS receiver 218 may also make use of the antenna 216 to receive GPS signals.

Figure 3:
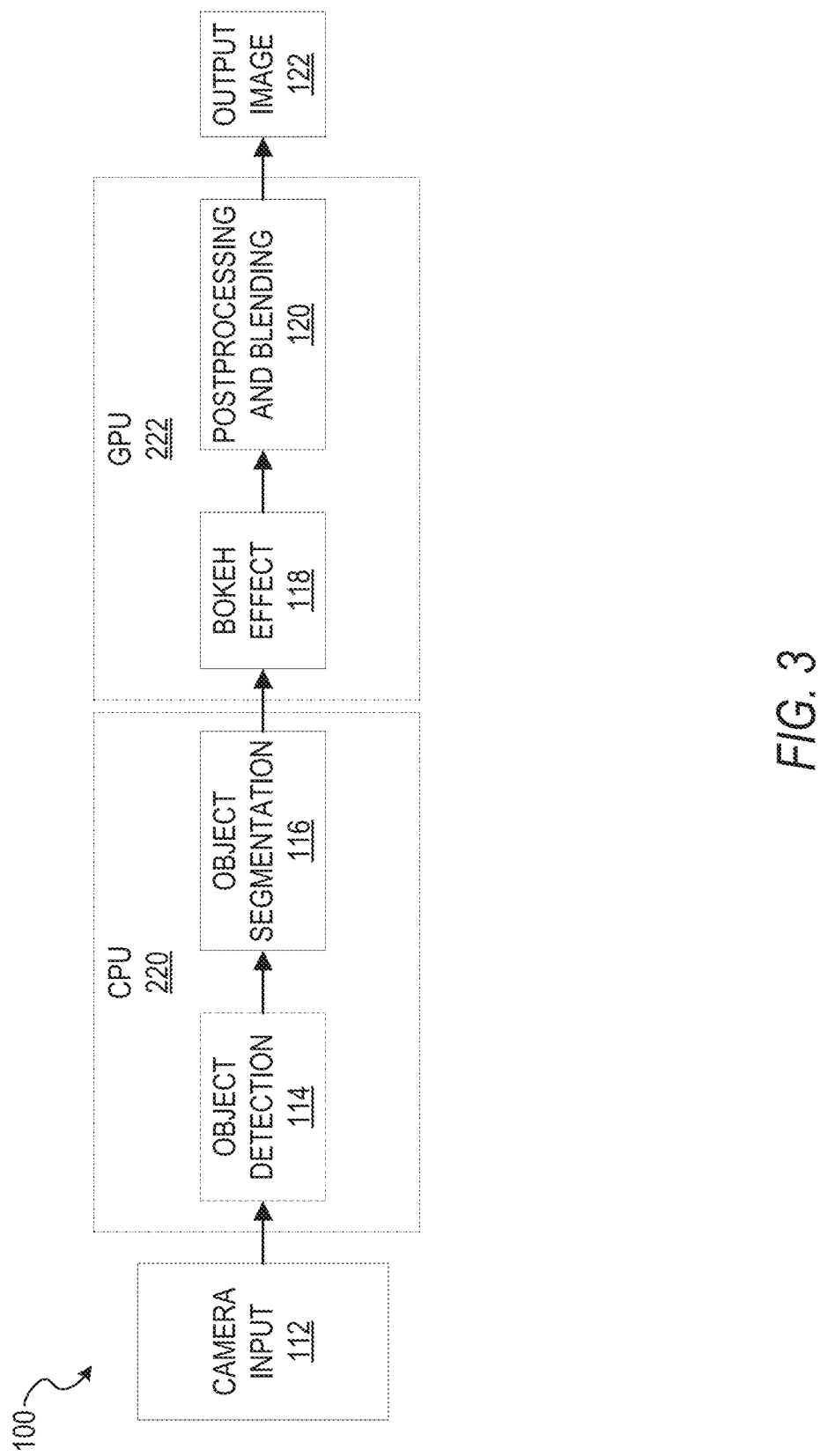
FIG. 3 illustrates is a block diagram illustrating a workflow of an automatic bokeh effect system and an example of a division of functions amongst a central processing unit (CPU) and a graphics processing unit (GPU), according to some example embodiments.

Example embodiments may be implemented using a CPU 220 of a mobile device 200, a GPU 222 of a mobile device 200, or a combination of the CPU 220 and GPU 222. FIG. 3 is a block diagram 100 illustrating the workflow of the automatic bokeh effect system, as shown in FIG. 1, but illustrating which components or functionality may be implemented by the CPU 220 and the GPU 222, according to some example embodiments. In this example, the optional object detection 114 and object segmentation 116 are implemented using the CPU 220, and the bokeh effect 118 and postprocessing and blending 120 are implemented using the GPU 222. In other examples, all the functions 114-120 may be implemented on the CPU 220, all the functions 114-120 may be implemented on the GPU 222, or some other combination of the CPU 220 and GPU 222 or other processor may be used to implement the functions 114-120. One benefit of using the GPU 222 for some or all the functions is that the image processing for the bokeh effect may be done in real-time (or near real-time). For instance, if all the functionality was implemented using the CPU 220, a rough estimate for a time to process an average image may be in the several hundred milliseconds (perhaps 500 milliseconds) versus the rough estimate to process an average image using the GPU 222 may be in the tens of milliseconds (perhaps 10-15 milliseconds), as shown in the example in FIG. 3.

In example embodiments, the bokeh effect may be implemented using a programming model to program the GPU 222 to achieve parallel computing, such as the OpenGL pipeline (which is cross-platform), Metal for iOS devices, OpenCL for Android devices, or other programming model.

Figure 4:
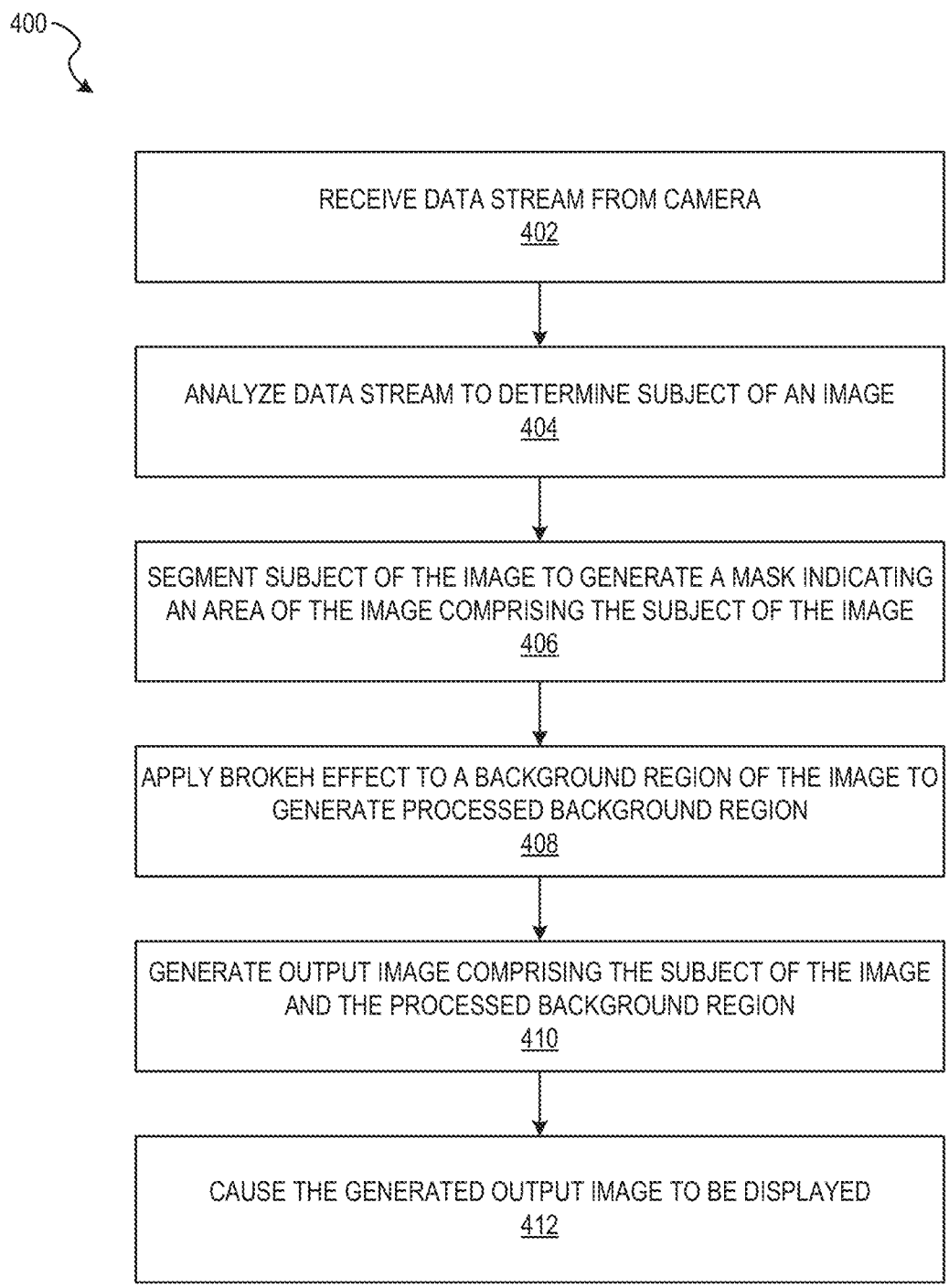
FIG. 4 is a flow chart illustrating aspects of a method, according to some example embodiments.

FIG. 4 is a flow chart illustrating aspects of a method 400 for applying a bokeh effect on an image or video, according to some example embodiments. For illustrative purposes, method 400 is described with respect to the bokeh effect system of FIG. 1 and computing device of FIG. 2. It is to be understood that method 400 may be practiced with other system configurations in other embodiments.

Figure 6:
FIG. 6 shows an example photograph before a bokeh effect has been applied, according to some example embodiments.

In operation 402, a mobile device receives a data stream (e.g., image) from a camera of the mobile device. For example, a user may be taking a photograph or video using the mobile device. In one example, the user presses a button on the mobile device or a display of the mobile device, or otherwise interacts with the mobile device to indicate that he is taking a photograph or video. In another example, the user may be simply viewing a scene or subject through the camera (e.g., via a display on the mobile device) but has not yet indicated that he wishes to capture a photograph or video. For example, a user may just be previewing what he may wish to capture. In yet another example, the mobile device may receive a photograph or video from a camera or computing device external to the mobile device. A bokeh effect may be applied to images in any of these, or other, scenarios, for example, on the photograph that has been captured (either via the camera of the mobile device or received from another camera or computing device), when the video is being captured, after the video is captured (e.g., capture of the entire video is complete), or as the user is looking at the display to determine what to capture in the photograph or video (e.g., before capture of a photograph or video). An example original image is shown in FIG. 6.

In operation 404, the mobile device analyzes the data stream (e.g., image) to determine a subject of an image. For example, the mobile device may analyze an image of a photograph or a frame of a video to determine a subject (e.g., face, person, tree, flower, house, etc.) of the image. The term data stream is used herein to generally describe photographs and videos and the term image is used to describe a photograph or frame of a video.

In one example, the mobile device may only want to apply the bokeh effect if the mobile device detects a face in the image. Thus, optionally the mobile device may first determine whether or not there is a face in the image to determine whether or not to proceed with applying the bokeh effect. Any object detection or face detection technology may be used to determine the subject of the image. One example of an object detection framework that may be used is the Viola-Jones object detection framework.

In operation 406, the mobile device segments the subject of the image to generate a mask indicating an area of the image comprising the subject of the image. Any object segmentation technology may be used. For example, a portrait segmentation using DNN-based technology may be applied to the image to generate a mask of the portrait as the subject of the image, including the person's hair, shoulder, and head wear. The segmented subject of the image may be used to distinguish from a background region of the image, to which the bokeh effect will be applied.

Figure 5:
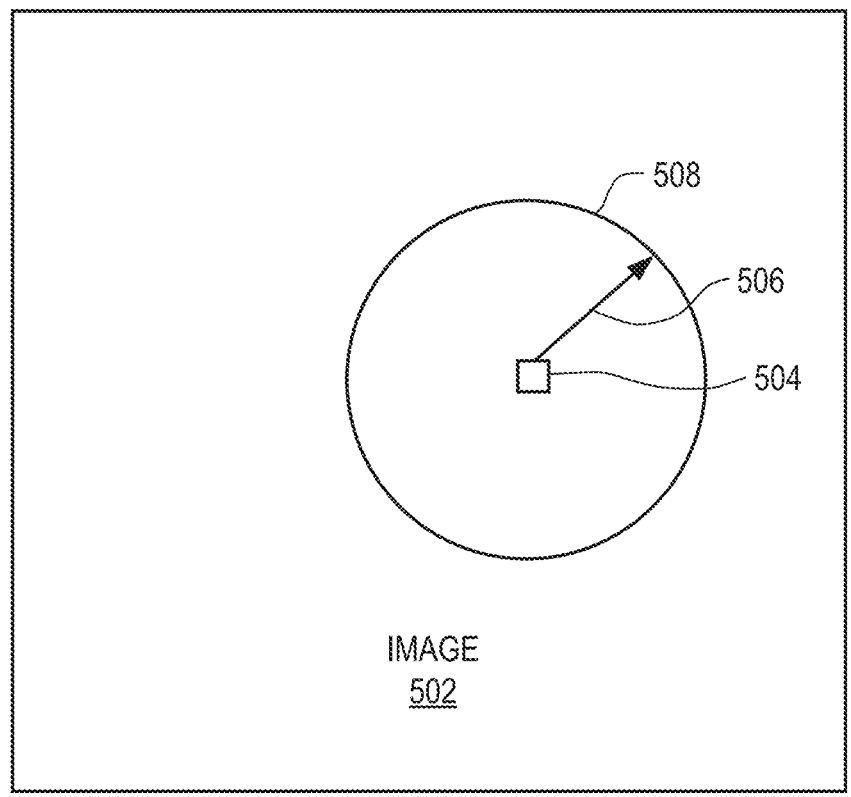
FIG. 5 illustrates application of a bokeh effect on an image, according to some example embodiments.

In operation 408, the mobile device applies a bokeh effect to a background region of the image to generate a processed background region. The background region of the image may comprise a region of the image that does not include the area of the image comprising the subject of the image. Example pseudocode for a bokeh effect algorithm is shown below and with reference to FIG. 5. This example pseudocode is for a circular bokeh algorithm. As illustrated in the diagram 500 in FIG. 5, the algorithm goes through every pixel p (504) in an image 502, and does a filtering using the surrounding pixels within a circle 508 with radius r (506). The following pseudocode is an example for calculating a value for a pixel p with coordinate (x,y):

```
vec3 color=(0.0, 0.0, 0.0); //output defined at vec3 color and
set to 0.0 for each of Red, Green, and Blue (RGB)
int count=0; //count for the number of pixels go through
For(i=x-r;i<x+r;i++) {
   for(j=y-r;j<y+r;j++{
   If ((i-x)^+(j-y)^2)<r^2) (//if pixel is inside circle around
     pixel p
     color+=p(i, j); //add pixel value to output
     count++; //increase pixel count by 1
   }
  }
}
color /=count;
```

In the above pseudocode example, the xy is the coordinate of the pixel inside the image and r is the radius of the circle. For example, the coordinate of the pixel is row x, column y in a grid comprising the image. The radius of the circle can be set to a predetermined size depending on how big the circle for the desired effect. For a larger circle, the radius may be increased and for a smaller circle, the radius may be decreased. To calculate the output value for pixel p, the values of the surrounding pixels are used to contribute to the final value of pixel p. The output for pixel p is defined as "vec3 color" and initially set to equal zero for each of the red, green, and blue (RGB) channels.

For each pixel of the surrounding pixels of pixel p, if the surrounding pixel is within the predetermined circle, the value of the surrounding pixel value is added to the output and the pixel count is increased by one. The result of the complete processing for the surrounding pixels of pixel p is a color value and a number of pixels that have been added to the color value. The color value is then normalized by the number of pixels that have been added to the color value, and this color value is output for pixel p at location x,y. The color value output for pixel p is the color value that will be used to produce the bokeh effect (e.g., blurred background of the image). This example shows what is done for one pixel. This same process would be done for each pixel in the background portion of the image (e.g., this operation would be applied for each pixel in the background portion of the image). To just apply this process to the background image a check may be made to determine whether a pixel is in the foreground (e.g., subject of the image) or the background region of the image. If it is in the background region, the operation described operation is done, if the pixel is in the foreground, the operation is skipped for that pixel.

This process could also be done for the entire image, but it will be significantly faster if it is done only on the background region of the image. For example, total runtime is linear to the number of pixels to be processed. Thus, if a subject of an image occupies one third of the total number of pixels, then one third of the computation would be saved by processing only the background region of the image.

The overall complexity of the algorithm in the example pseudocode above is O(width*height*r*r), which is a very expensive computation for a mobile device. Accordingly, the following pseudocode outlines a GPU implementation using a GPU's parallel architecture to speed up the algorithm. The following algorithm is a parallel algorithm implemented in a fragment shader inside a GPU. Thus, every step is executed for every pixel in parallel on the GPU, significantly increasing the speed of the image processing.

```
Image texture, which stores the original image. The object
mask is stored into the alpha channel of the image.
Sample the original texture value into color.
Center=vec4(0, 0, 0, 0); // RGBA values.
if (current center pixel belongs to the background)
{
   Go through an area surrounding the current pixel.
   Check if the surrounding pixel is inside the circle with a
radius r.
   {
      Retrieve pixel value into p.
      color+=vec4(p.rgb*p.a, p.a);
   }
}
// Blending the blurred background with the original image.
// For foreground, color.a=1; otherwise, color.a=0.
center.rgb=color.rgb/color.a*center.a+center.rgb*(1.0-center.a);
Output variable center.
```

In this example, a fragment shader inside the GPU is used to apply the processing outlined in the above pseudocode on every single pixel in the background region of the image. The image texture comprises the original image and the object mask for the subject of the image (e.g., portrait mask in some embodiments) is stored into the alpha channel of the image. The output is defined as "Center" with the RGB values of vec4 initially each set to zero.

To apply the bokeh effect to the background region of the image, the mobile device uses the above process to traverse a predefined area surrounding each pixel to determine a pixel value for each surrounding pixel, similar to what was describe above for the circular bokeh effect for one pixel. First, the mobile device determines whether the current pixel p (or center pixel) belongs to the background region. If it does not, the operation is skipped and the original value for that pixel is used (since it is part of the subject of the image). Based on determining that the center pixel belongs to the background region, each pixel value for each surrounding pixel is retrieved and a blurred value is generated for the center pixel based on the pixel value for each of the surrounding pixels. As described earlier, the result of the complete processing for the surrounding pixels of pixel p is a color value and a number of pixels that have been added to the color value. The color value is then normalized by the number of pixels that have been added to the color value, and this color value is output for pixel p at location x,y. The blurred background is then blended with the subject of the image.

Since the above process allows for all of the pixels to be processed at the same time (e.g., in parallel), performing this image processing on the GPU results in much faster processing than if it was done serially on the CPU. Moreover, if done on the CPU, the image processing and blending calculations are done as separate steps. The separation of image processing and blending calculation requires that image data be transfer from the CPU to the GPU before the blending, which can also cause significant overhead and prevent the processing to be done in real time. But on the GPU, the bending can be merged into the bokeh effect and thus blending becomes almost free in terms of time for processing.

Returning to FIG. 4, in operation 410, the mobile device generates the output image comprising the subject of the image and the processed background region. As explained above, this comprises blending each blurred value for each pixel of the plurality of pixels that belongs to the background region of the image, with the subject of the image. This may be done as part of applying the bokeh effect, as explained above.

Generating an output image may further comprise post-processing of the image to adjust or clarify the image. For example, generating the output image may comprise adjusting the brightness of the processed background region by analyzing each pixel value a predetermined shape area to determine whether the brightness of the pixel should be increased.

The bokeh effect by nature comprises a low pass filtering algorithm, which distributes highlights of pixels from the original background image into surrounding areas. Thus, for any highlight (e.g., a bright spot such as the sun, a star, a light bulb, etc.), the brightness is lowered after applying the bokeh effect. This may make the bokeh effect less obvious and potentially less attractive. To avoid such brightness degradation, example embodiments optionally provide an adaptive brightness adjustment to be used to compensate the pixels' value reduction caused by the low pass filtering. Example pseudocode for such an algorithm is shown in the following:

Two textures are used. One is bokeh texture, which stores the bokeh shape texture. Another one is image texture, which stores the original image. The object mask is stored into the alpha channel of the image.
//Sample the original texture value into color.
color=texture(coordinate.x, coordinate.y)
center=vec4(0, 0, 0, 0); // RGBA values.
A threshold dynamicThreshold is set with an initial value 1.5:
dynamicThreshold=1.5;
if (current center pixel belongs to the background)
{
  Go through an area surrounding the current pixel.
  Sample texture to retrieve the pixel value from bokeh texture.
  If bokeh pixel value is 1, we will consider it inside the shape area
  {
    Retrieve pixel value into p.
    Check if the sum of the 3 channels of p is larger than dynamicThreshold (1), sum=p.r+p.g+p.b;
    if(sum>dynamicThreshold)
    {
      We increase the dynamicThreshold by a predefined value, dynamicThreshold+=predefinedValue. (for example, 0.2)
      P*=(1+gain); //typical value for gain: 1~3; this means we will increase the pixel value if the original pixel is bright enough. And since we increase the dynamicThreshold value, as we go through the surround pixels, fewer pixels will meet the if condition (1), this guarantees that the brightness value won't go too high to cause an over-exposure.
      color+=vec4(p.rgb*p.a, p.a);
    }
  }
}
// Blending the blurred background with the original image.
center.rgb=color.rgb/color.a*center.a+center.rgb*(1.0−center.a);

In this example, two textures are used. One is a bokeh texture which stores a bokeh shape texture (e.g., to accommodate any shape for the bokeh effect, such as a circle, heart, star, etc., as described below), and one is an image texture, which stores the original image, as described above. As also described above, the object mask is stored into the alpha channel.

In this process, a predetermined threshold called dynamicThreshold is used. In this example, the dynamicThreshold is initially set to 1.5. The process then goes through each pixel in the image and determines whether it is in the background region. If it is not in the background region, it is skipped. For each pixel determined to be in the background region, the process goes through an area surrounding the current pixel and determines whether it is in the bokeh shape area (e.g., a circle, heart, star, or other shape based on the bokeh shape texture). If the pixel is inside the shape area, the process retrieves the pixel value of the pixel into p, sums the three channels of the p together, and then checks whether the value of the sum is larger than the dynamicThreshold. For each pixel color value (e.g., RGB), the range for the color value is from 0 to 1. Thus, the sum of the values may be from 0 to 3. Using the dynamicThreshold, the process can determine whether the pixel is bright or not. The dynamicThreshold is used to make sure the result is not too bright, otherwise the result may appear as overexposure.

After entering into the calculation of the brightness of the pixels in the bokeh shape, the dynamic threshold is increased by a predetermined value (e.g., .1 or .2). The pixel value p is increased by a gain. A predetermined value is also used for the gain (e.g., 1-3). Increasing the dynamicThreshold during the processing of the pixels with the bokeh shape ensures that the final average of the color values of the pixels of the shape will not be too high and appear overexposed.

Figure 7:
FIGS. 7-9 show example photographs with a bokeh effect, according to some example embodiments.
Figure 8:
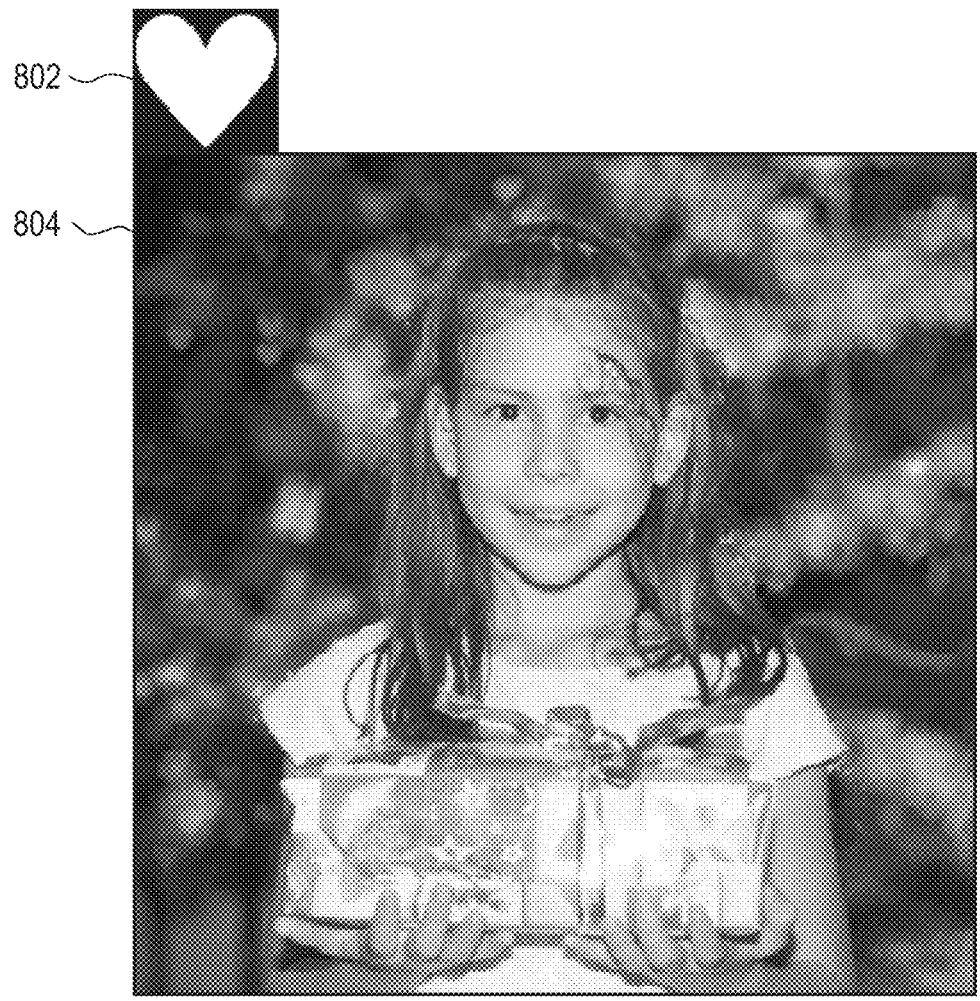
Figure 9:
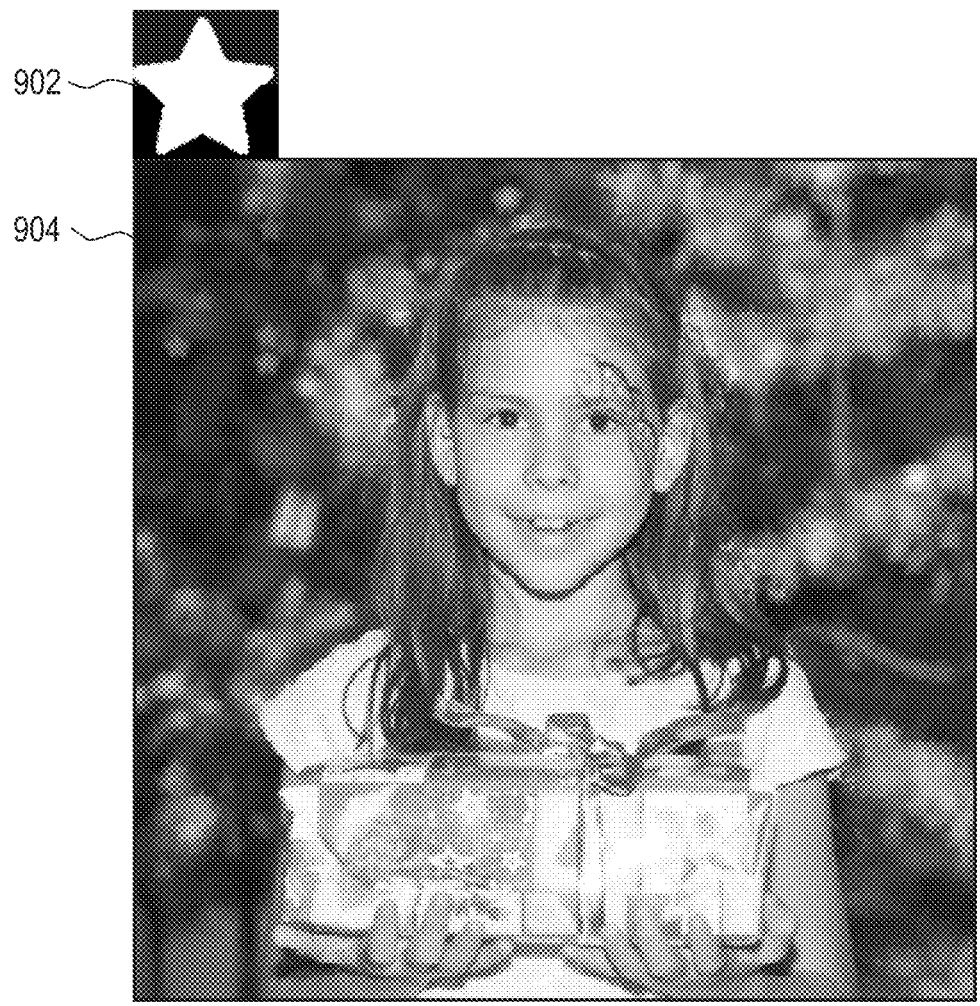

In operation 412, the mobile device causes the generated output image to display on the display of the mobile device. Example generated output images are shown in FIGS. 7-9.

In the above example, a circular shape is used to apply the bokeh effect, similar to a typical bokeh image generated by a DSLR with wide-opened aperture. In other example embodiments, a custom shape may be used to apply the bokeh effect. For example, a heart, star, or any other shape may be used. FIG. 6 shows an original image to be processed to apply the bokeh effect. The image in FIG. 6 has a focused background behind the girl in the image. FIG. 7 shows the image with the circular bokeh effect applied. The background behind the girl in the image in FIG. 7 is blurred using a circular shape. FIGS. 8 and 9 show two examples produced using custom shapes. FIG. 8 shows the image 804 with a heart 802 bokeh effect applied such that the highlight becomes heart shaped in the background. FIG. 9 shows the image 904 with a star 902 bokeh effect applied showing stars across the background of the image. A heart and star shape are shown and discussed as example shapes, however, it is understood that example embodiments may support any shape. A bokeh kernel image (e.g., a 32×32 black-white image) may be used, indicating the bokeh shape.

The bokeh effect with a custom shape is very computationally-intensive. With the GPU-accelerated system described above, however, example embodiments can efficiently support real-time bokeh filtering with custom shapes. Example pseudocode for a custom-shape bokeh effect algorithm comprises the following:

Two textures are used. One is bokeh texture, which stores the bokeh shape texture. Another one is image texture, which stores the original image. The object mask is stored into the alpha channel of the image.
Sample the original texture value into color.
Center=vec4(0, 0, 0, 0); // RGBA values.
if (current center pixel belongs to the background)
{
  Go through an area surrounding the current pixel inside a box (box size width=2r, height=2r). Sample texture to retrieve the pixel value from bokeh texture. If bokeh pixel value is 1, we will consider it inside the shape area
  {
  Retrieve pixel value into p.
  color+=vec4(p.rgb*p.a, p.a);
  }
}
// Blending the blurred background with the original image.
center.rgb=color.rgb/color.a*center.a+center.rgb*(1.0−center.a);

The above pseudocode and process is similar to what was shown and described above for the circular bokeh shape, but instead stores a second texture with the bokeh shape. The bokeh shape stored as the second texture is used instead of the circular shape as described above. For example, when determining the surrounding pixels for a particular pixel, the system checks that the surrounding pixel belongs to a particular shape area (circular, star, heart, or other shape). By using a second texture to store the shape, example embodiments avoid doing a lot of calculations to calculate the shape.

Example embodiments may be used in a variety of use cases. For example, exampled embodiments may be used in a camera application to apply a bokeh effect to a photograph or video. In another example, example embodiments may be used in a messaging system or application to apply a bokeh effect to a preview of a photograph or video, a captured photograph or video, during capture of a video, and so forth. The photograph or video with the bokeh effect may be shared via the messaging system with one or more users. For example, the photograph or vide with the bokeh effect may be sent as a message to one or more users, added to a media collection, enhanced with further effects such as media overlays, text, and the like.

Figure 10:
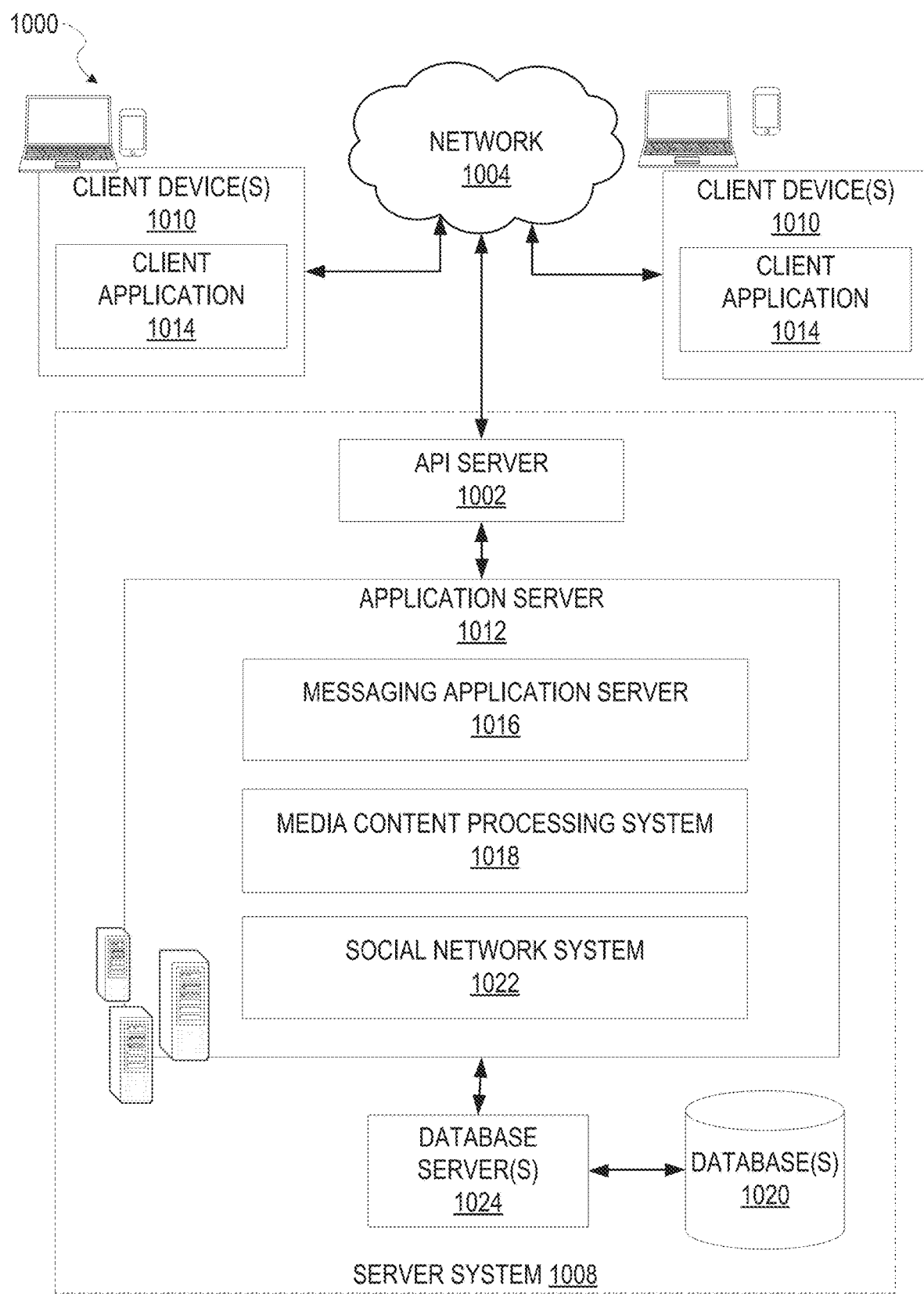
FIG. 10 is a block diagram showing an example messaging system for exchanging data (e.g., messages and associated content) over a network, according to some example embodiments.

FIG. 10 is a block diagram illustrating a networked system 1000 (e.g., a messaging system) for exchanging data (e.g., messages and associated content) over a network. The networked system 1000 includes multiple client devices 1010, each of which hosts a number of client applications 1014. Each client application 1014 is communicatively coupled to other instances of the client application 1014 and a server system 1008 via a network 1004.

The client device 1010 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 1000. In some embodiments, the client device 1010 may comprise a display module (not shown) to display information (e.g., in the form of user interfaces). In further embodiments, the client device 1010 may comprise one or more of touch screens, accelerometers, gyroscopes, cameras, microphones, global positioning system (GPS) devices, and so forth. In some embodiments, the client device 1010 is mobile device 200 of FIG. 2.

The client device 1010 may be a device of a user that is used to create media content items such as video, images (e.g., photographs), and audio, and to send and receive messages containing such media content items, text, and so forth, to and from other users. The client device 1010 may be a device of a user that is used to create and edit media overlays and access a plurality of media collections. The client device 1010 may be a device of a user that is used to apply a bokeh effect to a photograph or video, as described above.

One or more users may be a person, a machine, or other means of interacting with the client device 1010. In example embodiments, the user may not be part of the system 1000, but may interact with the system 1000 via the client device 1010 or other means. For instance, the user may provide input (e.g., touch screen input or alphanumeric input) to the client device 1010, and the input may be communicated to other entities in the system 1000 (e.g., third party servers, server system 1008, etc.) via a network 1004. In this instance, the other entities in the system 1000, in response to receiving the input from the user, may communicate information to the client device 1010 via the network 1004 to be presented to the user. In this way, the user may interact with the various entities in the system 1000 using the client device 1010.

The system 1000 may further include a network 1004. One or more portions of the network 1004 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 1010 may access the various data and applications provided by other entities in the system 1000 via a web client (e.g., a browser, such as the Internet Explorer® browser developed by Microsoft® Corporation of Redmond, Wash. State) or one or more client applications 1014. The client device 1010 may include one or more client applications 1014 (also referred to as "apps") such as, but not limited to, a web browser, a messaging application, an electronic mail (email) application, an e-commerce site application, a mapping or location application, a media overlay application, an interactive messaging application, an application for applying a bokeh effect to an image, and the like.

In some embodiments, one or more client applications 1014 may be included in a given one of the client devices 1010, and configured to locally provide the user interface and at least some of the functionalities, with the client application 1014 configured to communicate with other entities in the system 1000 (e.g., third-party servers, server system 1008, etc.), on an as-needed basis, for data and/or processing capabilities not locally available (e.g., to process user queries, to authenticate a user, to verify a method of payment, etc.). Conversely, one or more client applications 1014 may not be included in the client device 1010, and then the client device 1010 may use its web browser to access the one or more applications hosted on other entities in the system 1000 (e.g., third-party servers, server system 1008, etc.).

In one example, a client application 1014 may be a messaging application that allows a user to take a photograph or video, add a caption or otherwise edit the photograph or video (e.g., apply a bokeh effect in some embodiments), and then send the photograph or video to another user. In one example, the message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video, and other such content that may be stitched together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection (also referred to herein as a "media collection"). A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event, etc.), or lasting another predetermined time).

An ephemeral message may be associated with a message duration parameter, the value of which determines an amount of time that the ephemeral message will be displayed to a receiving user of the ephemeral message by the client application 1014. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

The server system 1008 may provide server-side functionality via the network 1004 (e.g., the Internet or a wide area network (WAN)) to one or more client devices 1010 and/or one or more third party servers (not shown). The server system 1008 may include an application programming interface (API) server 1002, an application server 1012, a messaging application server 1016, a media content processing system 1018, and a social network system 1022, which may each be communicatively coupled with each other and with one or more data storage(s), such as database(s) 1020.

The server system 1008 may be a cloud-computing environment, according to some example embodiments. The server system 1008, and any servers associated with the server system 1008, may be associated with a cloud-based application, in one example embodiment.

The one or more database(s) 1020 may be storage devices that store information such as untreated media content, original media content from users (e.g., high-quality media content), processed media content (e.g., media content that is formatted for sharing with client devices 1010 and viewing on client devices 1010), context data related to a media content item, context data related to a user device (e.g., computing or client device 1010), media overlays, media overlay smart widgets or smart elements, user data, user device information, media content (e.g., video and images), media content data (e.g., data associated with video and images), computing device context data, serialized data, session data items, and so forth. The one or more databases 1020 may further store information related to third-party servers, third-party applications, client devices 1010, client applications 1014, users, and so forth.

The one or more database(s) 1020 may include cloud-based storage external to the server system 1008 (e.g., hosted by one or more third-party entities external to the server system 1008). While the storage devices are shown as database(s) 1020, it is to be understood that the system 1000 may access and store data in storage devices such as databases 1020, blob storages, and other types of storage methods.

The system 1000 may further include one or more third-party servers (not shown). The one or more third-party servers may include one or more third-party application(s). The one or more third-party application(s), executing on the third-party server(s), may interact with the server system 1008 via API server 1002 via a programmatic interface provided by the API server 1002. For example, one or more of the third-party applications may request and utilize information from the server system 1008 via the API server 1002 to support one or more features or functions on a website hosted by the third party or an application hosted by the third party. The third-party website or application, for example, may provide functionality that is supported by relevant functionality and data in the server system 1008.

Accordingly, each client application 1014 can communicate and exchange data with other client applications 1014 and with the server system 1008 via the network 1004. The data exchanged between client applications 1014, and between a client application 1014 and the server system 1008, includes functions (e.g., commands to invoke functions) as well as payload data (e.g., text, audio, video, or other multimedia data).

The server system 1008 provides server-side functionality via the network 1004 to a particular client application 1014. While certain functions of the system 1000 are described herein as being performed by either a client application 1014 or by the server system 1008, it will be appreciated that the location of certain functionality either within the client application 1014 or within the server system 1008 is a design choice. For example, it may be technically preferable to initially deploy certain technology and functionality within the server system 1008, but to later migrate this technology and functionality to the client application 1014 where a client device 1010 has a sufficient processing capacity.

The server system 1008 supports various services and operations that are provided to the client application 1014. Such operations include transmitting data to, receiving data from, and processing data generated by the client application 1014. This data may include message content, client device information, geolocation information, media annotation and overlays, message content persistence conditions, social network information, live event information, date and time stamps, media content (e.g., video and images), media content data (e.g., data associated with video and images), and user data (e.g., user click data), as examples. Data exchanges within the networked system 1000 are invoked and controlled through functions available via user interfaces (UIs) of the client application 1014.

In the server system 1008, the API server 1002 is coupled to, and provides a programmatic interface to, the application server 1012. The application server 1012 is communicatively coupled to a database server 1024, which facilitates access to the one or more database(s) 1020 in which is stored data associated with messages processed by the application server 1012.

The API server 1002 receives and transmits message data (e.g., commands and message payloads) between the client device 1010 and the application server 1012. Specifically, the API server 1002 provides a set of interfaces (e.g., routines and protocols) that can be called or queried by the client application 1014 to invoke functionality of the application server 1012. The API server 1002 exposes various functions supported by the application server 1012, including account registration; login functionality; the sending of messages, via the application server 1012, from a particular client application 1014 to another client application 1014; the sending of media files (e.g., images or video) from a client application 1014 to the messaging application server 1016, for possible access by another client application 1014; the setting of a collection of media data (e.g., a gallery, story, message collection, or media collection); the retrieval of a list of friends of a user of a client device 1010; the retrieval of such collections; the retrieval of messages and content; the adding of friends to and deletion of friends from a social graph; the location of friends within a social graph; opening an application event (e.g., relating to the client application 1014); and so forth.

The application server 1012 hosts a number of applications and subsystems, including the messaging application server 1016, the media content processing system 1018, and the social network system 1022. The messaging application server 1016 implements a number of message processing technologies and functions, particularly related to the aggregation and other processing of content (e.g., textual and multimedia content) included in messages received from multiple instances of the client application 1014. The text and media content from multiple sources may be aggregated into collections of content (e.g., called stories, galleries, or media collections). These collections are then made available, by the messaging application server 1016, to the client application 1014. Other processor- and memory-intensive processing of data may also be performed server-side by the messaging application server 1016, in view of the hardware requirements for such processing.

The application server 1012 also includes the media content processing system 1018, which is dedicated to performing various media content processing operations, typically with respect to images or video received within the payload of a message at the messaging application server 1016. The media content processing system 1018 may access one or more data storages (e.g., database(s) 1020) to retrieve stored data to use in processing media content and to store results of processed media content.

The social network system 1022 supports various social networking functions and services, and makes these functions and services available to the messaging application server 1016. To this end, the social network system 1022 maintains and accesses an entity graph 1204 (depicted in FIG. 12) within the database 1020. Examples of functions and services supported by the social network system 1022 include the identification of other users of the networked system 1000 with whom a particular user has relationships or whom the particular user is "following," and also the identification of other entities and interests of a particular user.

The messaging application server 1016 may be responsible for generation and delivery of messages between users of client devices 1010. The messaging application server 1016 may utilize any one of a number of message delivery networks and platforms to deliver messages to users. For example, the messaging application server 1016 may deliver messages using electronic mail (email), instant message (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth).

Figure 11:
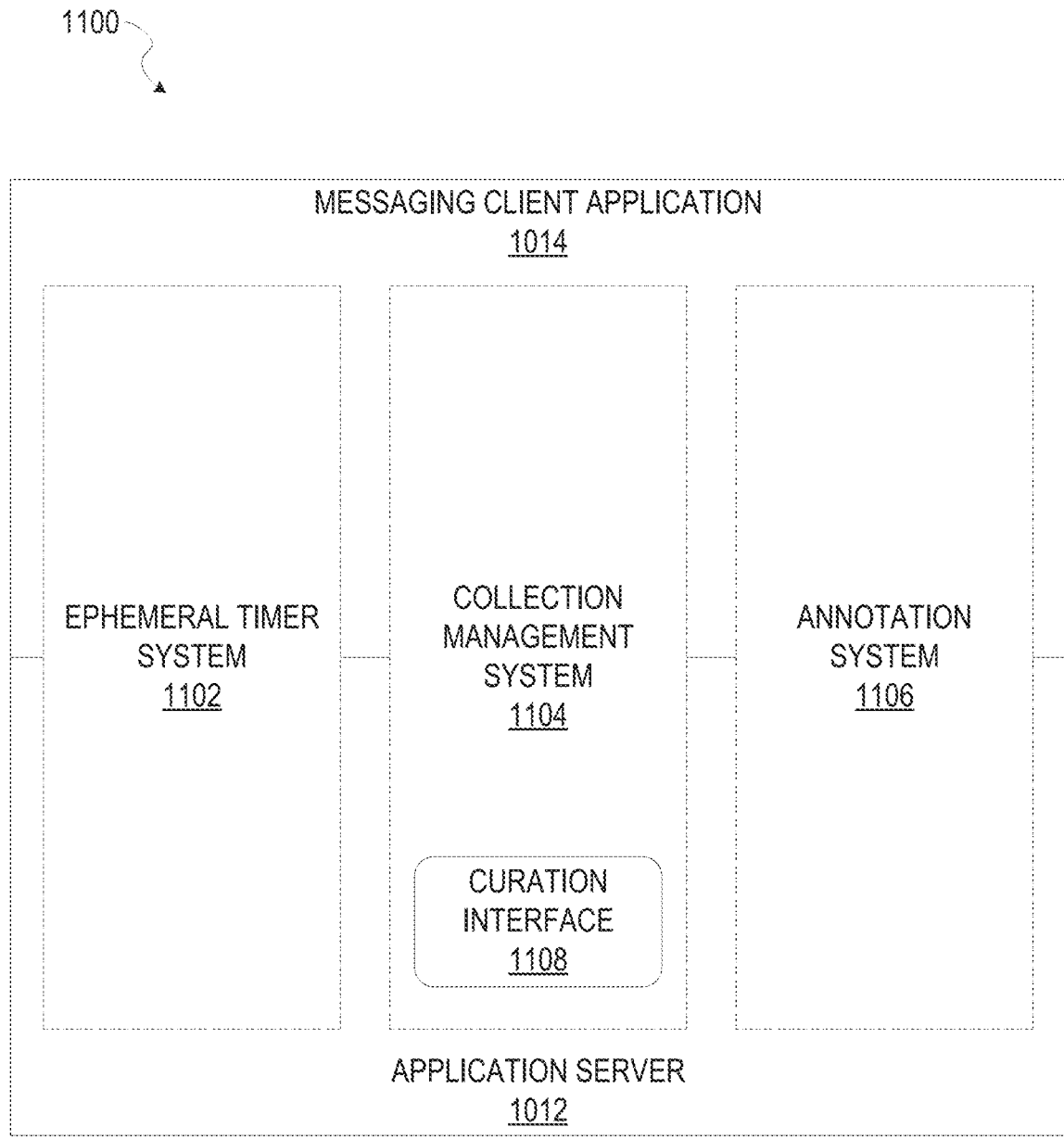
FIG. 11 is a block diagram illustrating further details regarding the messaging system, according to some example embodiments.

FIG. 11 is a block diagram 1100 illustrating further details regarding the networked system 1000, according to example embodiments. Specifically, the system 1100 is shown to comprise the messaging client application 1014 and the application server 1012, which in turn embody a number of subsystems, namely an ephemeral timer system 1102, a collection management system 1104, and an annotation system 1106.

The ephemeral timer system 1102 is responsible for enforcing the temporary access to content permitted by the messaging client application 1014 and the messaging application server 1016. To this end, the ephemeral timer system 1102 incorporates a number of timers that, based on duration and display parameters associated with a message, or collection of messages (e.g., otherwise referred to herein as media collections, galleries, message collections, stories, and the like), selectively display and enable access to messages and associated content via the messaging client application 1014.

The collection management system 1104 is responsible for managing collections of media (e.g., collections of text, image, video, and audio data), otherwise referred to herein as "media collections." In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "Story" for the duration of that music concert. The collection management system 1104 may also be responsible for publishing an icon that provides notification of the existence of a particular collection to the user interface of the messaging client application 1014.

The collection management system 1104 furthermore includes a curation interface 1108 that allows a collection manager to manage and curate a particular collection of content. For example, the curation interface 1108 enables an event organizer to curate a collection of content relating to a specific event (e.g., delete inappropriate content or redundant messages). Additionally, the collection management system 1104 employs machine vision (or image recognition technology) and content rules to automatically curate a content collection. In certain embodiments, compensation (e.g., money, non-money credits or points associated with the messaging system or a third-party reward system, travel miles, access to artwork or specialized lenses, etc.) may be paid to a user for inclusion of user-generated content into a collection. In such cases, the curation interface 1108 operates to automatically make payments to such users for the use of their content.

The annotation system 1106 provides various functions that enable a user to annotate or otherwise modify or edit media content associated with a message. For example, the annotation system 1106 provides functions related to the generation and publishing of media overlays for messages processed by the networked system 1000. In one example, the annotation system 1106 operatively supplies a media overlay (e.g., a filter or media augmentation) to the messaging client application 1014 based on a geolocation of the client device 1010. In another example, the annotation system 1106 operatively supplies a media overlay to the messaging client application 1014 based on other information, such as social network information of the user of the client device 1010. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 1010. For example, the media overlay includes text that can be overlaid on top of a photograph taken by the client device 1010. In another example, the media overlay includes an identification of a location overlay (e.g., Venice Beach), a name of a live event, or a name of a merchant overlay (e.g., Beach Coffee House). In another example, the annotation system 1106 uses the geolocation of the client device 1010 to identify a media overlay that includes the name of a merchant at the geolocation of the client device 1010. The media overlay may include other indicia associated with the merchant. The media overlays may be stored in the database 1020 and accessed through the database server 1024.

The annotation system 1106 may further enable a user to interact with an interactive message, such as by adding one or more media content items to the interactive message, as described in further detail below. In one example embodiment, the annotation system 1106 provides a publication platform that allows a user or merchant to create an interactive message with a plurality of objects associated with the interactive message for which users may add personal content. For example, a designer may create a video of a rock band with various interactive objects for different members of the band (a drummer, a keyboard player, a guitarist, etc.). The video of the rock band may be made available to users as an interactive message.

In one example embodiment, the annotation system 1106 provides a user-based publication platform that enables users to select a geolocation on a map, and upload content associated with the selected geolocation. The user may also specify circumstances under which a particular media overlay is to be offered to other users. The annotation system 1106 generates a media overlay that includes the uploaded content and associates the uploaded content with the selected geolocation.

In another example embodiment, the annotation system 1106 provides a merchant-based publication platform that enables merchants to select a particular media overlay associated with a geolocation via a bidding process. For example, the annotation system 1106 associates the media overlay of a highest bidding merchant with a corresponding geolocation for a predefined amount of time.

Figure 12:
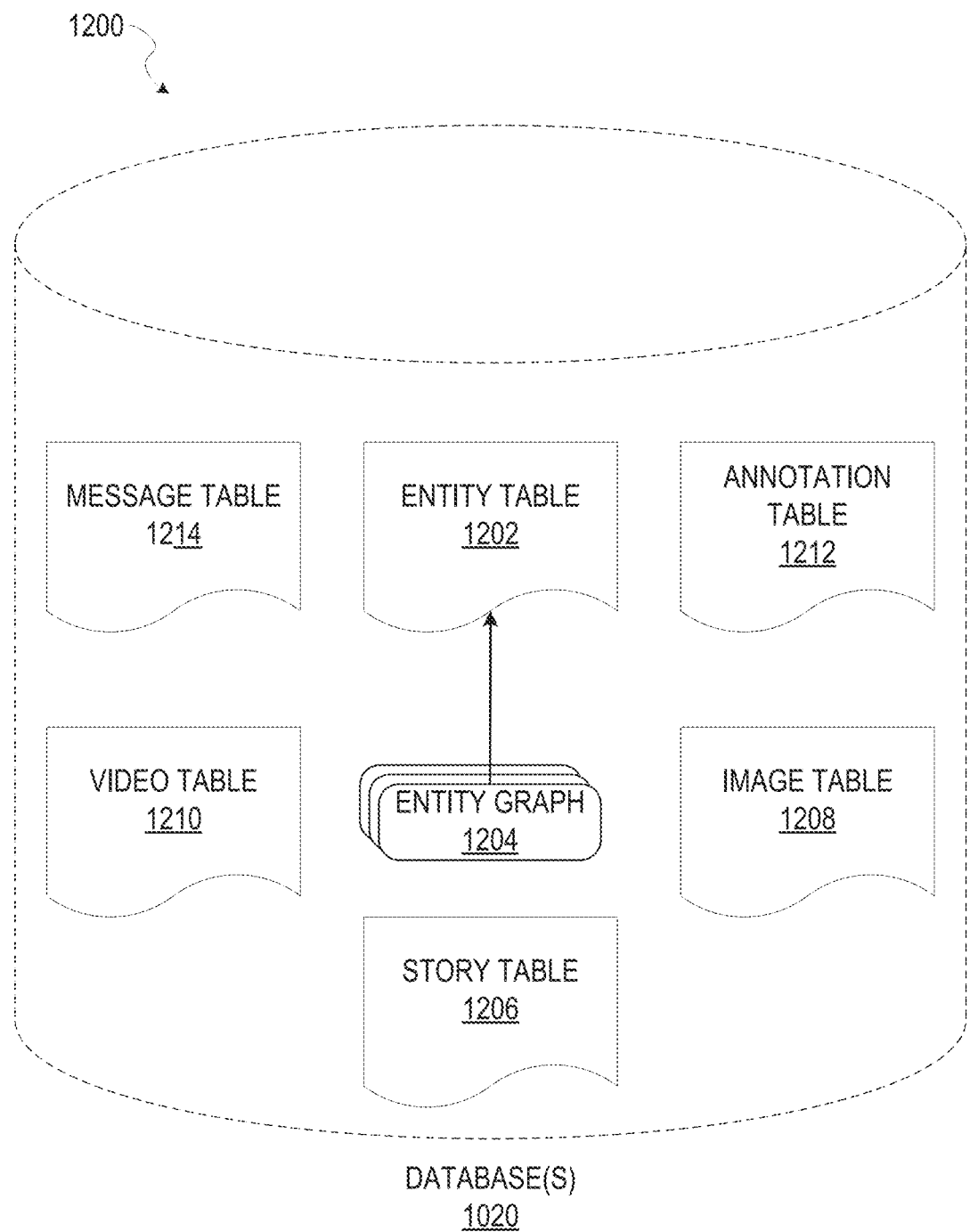
FIG. 12 is a schematic diagram illustrating data which may be stored in a database of a messaging server system, according to some example embodiments.

FIG. 12 is a schematic diagram 1200 illustrating data which may be stored in the database(s) 1020 of the server system 1008, according to certain example embodiments. While the content of the database 1020 is shown to comprise a number of tables, it will be appreciated that the data could be stored in other types of data structures (e.g., as an object-oriented database).

The database 1020 includes message data stored within a message table 1214. An entity table 1202 stores entity data, including an entity graph 1204. Entities for which records are maintained within the entity table 1202 may include individuals, corporate entities, organizations, objects, places, events, etc. Regardless of type, any entity regarding which the server system 1008 stores data may be a recognized entity. Each entity is provided with a unique identifier, as well as an entity type identifier (not shown).

The entity graph 1204 furthermore stores information regarding relationships and associations between entities. Such relationships may be social, professional (e.g., work at a common corporation or organization), interested-based, or activity-based, merely for example.

The database 1020 also stores annotation data, in the example form of media overlays or filters, in an annotation table 1212. Annotation data may also be referred to herein as "creative tools" or "interactive features." Annotation data may comprise predefined interactive messages to be provided to users.

Media overlays or filters, for which data is stored within the annotation table 1212, are associated with and applied to videos (for which data is stored in a video table 1210) and/or images (for which data is stored in an image table 1208). Filters, in one example, are overlays that are displayed as overlaid on an image or video during presentation to a recipient user. Filters may be of various types, including user-selected filters from a gallery of filters presented to a sending user by the messaging client application 1014 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 1014, based on geolocation information determined by a GPS unit of the client device 1010. Another type of filter is a data filter, which may be selectively presented to a sending user by the messaging client application 1014, based on other inputs or information gathered by the client device 1010 during the message creation process. Examples of data filters include a current temperature at a specific location, a current speed at which a sending user is traveling, a battery life for a client device 1010, or the current time.

Other annotation data that may be stored within the annotation table 1212 is so-called "lens" data. A "lens" may be a real-time special effect and sound that may be added to an image or a video.

As mentioned above, the video table 1210 stores video data which, in one embodiment, is associated with messages for which records are maintained within the message table 1214. Similarly, the image table 1208 stores image data associated with messages for which message data is stored in the message table 1214. The entity table 1202 may associate various annotations from the annotation table 1212 with various images and videos stored in the image table 1208 and the video table 1210.

A story table 1206 stores data regarding collections of messages and associated image, video, or audio data, which are compiled into a collection (e.g., a story, gallery, or media collection). The creation of a particular collection may be initiated by a particular user (e.g., any user for whom a record is maintained in the entity table 1202). A user may create a "personal story" in the form of a collection of content that has been created and sent/broadcast by that user. To this end, the user interface of the messaging client application 1014 may include an icon that is user-selectable to enable a sending user to add specific content to his or her personal story.

A media or message collection may also constitute a "live story," which is a collection of content from multiple users that is created manually, automatically, or using a combination of manual and automatic techniques. For example, a "live story" may constitute a curated stream of user-submitted content from various locations and events. Users whose client devices 1010 have location services enabled and are at a common event location at a particular time may, for example, be presented with an option, via a user interface of the messaging client application 1014, to contribute content to a particular live story. The live story may be identified to the user by the messaging client application 1014, based on his or her location. The end result is a "live story" told from a community perspective.

A further type of content collection is known as a "location story," which enables a user whose client device 1010 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 13:
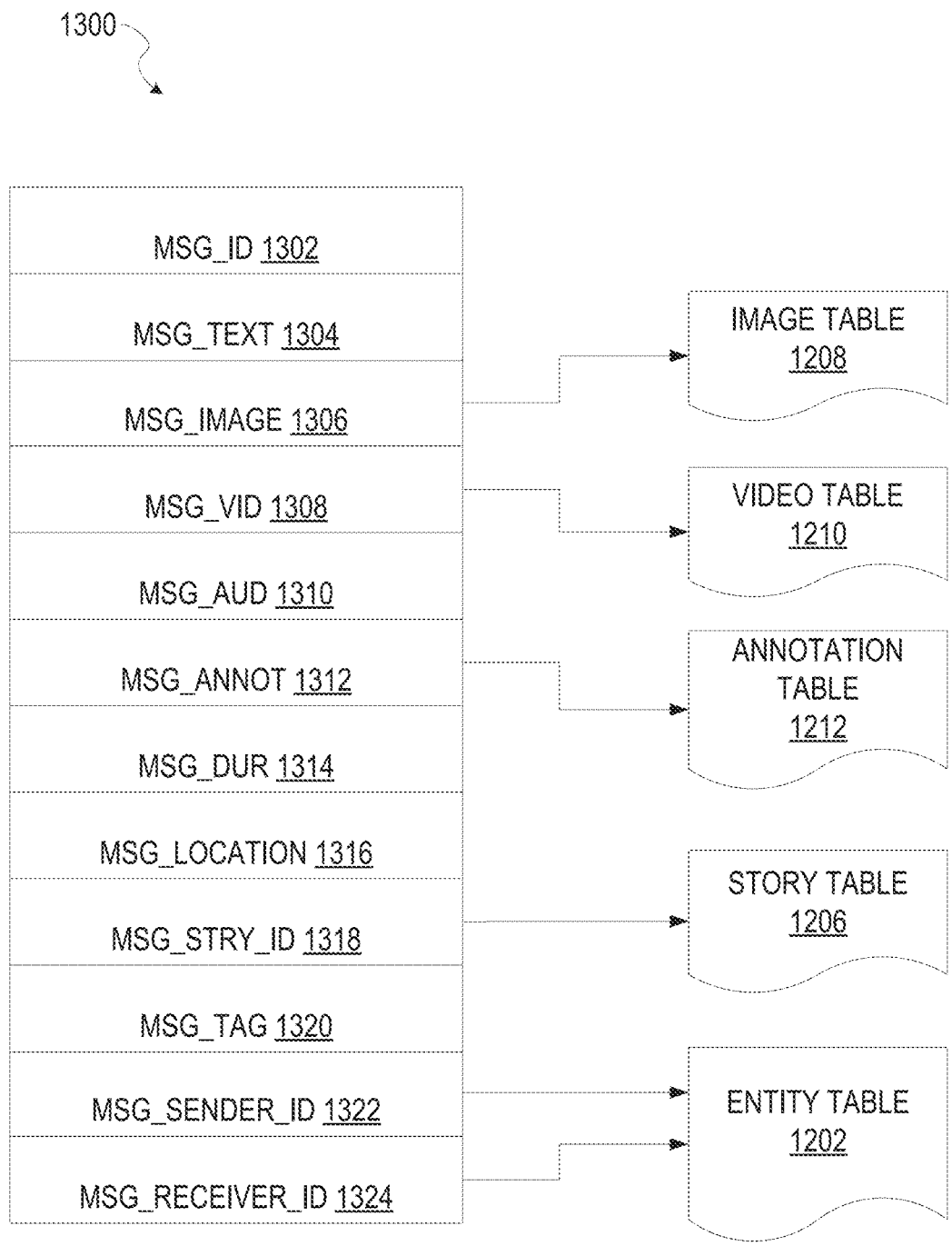
FIG. 13 is a schematic diagram illustrating a structure of a message, according to some embodiments, generated by a messaging client application for communication.

FIG. 13 is a schematic diagram illustrating a structure of a message 1300, according to some embodiments, generated by a client application 1014 for communication to a further client application 1014 or the messaging application server 1016. The content of a particular message 1300 is used to populate the message table 1214 stored within the database 1020, accessible by the messaging application server 1016. Similarly, the content of a message 1300 is stored in memory as "in-transit" or "in-flight" data of the client device 1010 or the application server 1012. The message 1300 is shown to include the following components:

- A message identifier 1302: a unique identifier that identifies the message 1300.
- A message text payload 1304: text, to be generated by a user via a user interface of the client device 1010 and that is included in the message 1300.
- A message image payload 1306: image data, captured by a camera component of a client device 1010 or retrieved from memory of a client device 1010, and that is included in the message 1300.
- A message video payload 1308: video data, captured by a camera component or retrieved from a memory component of the client device 1010 and that is included in the message 1300.
- A message audio payload 1310: audio data, captured by a microphone or retrieved from the memory component of the client device 1010, and that is included in the message 1300.
- A message annotations 1312: annotation data (e.g., media overlays such as filters, stickers, or other enhancements) that represents annotations to be applied to the message image payload 1306, message video payload 1308, or message audio payload 1310 of the message 1300.
- A message duration parameter 1314: a parameter value indicating, in seconds, the amount of time for which content of the message 1300 (e.g., the message image payload 1306, message video payload 1308, message audio payload 1310) is to be presented or made accessible to a user via the messaging client application 1014.
- A message geolocation parameter 1316: geolocation data (e.g., latitudinal and longitudinal coordinates) associated with the content payload of the message 1300. Multiple message geolocation parameter 1316 values may be included in the payload, each of these parameter values being associated with respect to content items included in the content (e.g., a specific image within the message image payload 1306, or a specific video in the message video payload 1308).
- A message story identifier 1318: identifier values identifying one or more content collections (e.g., "stories") with which a particular content item in the message image payload 1306 of the message 1300 is associated. For example, multiple images within the message image payload 1306 may each be associated with multiple content collections using identifier values.
- A message tag 1320: each message 1300 may be tagged with multiple tags, each of which is indicative of the subject matter of content included in the message payload. For example, where a particular image included in the message image payload 1306 depicts an animal (e.g., a lion), a tag value may be included within the message tag 1320 that is indicative of the relevant animal. Tag values may be generated manually, based on user input, or may be automatically generated using, for example, image recognition.
- A message sender identifier 1322: an identifier (e.g., a messaging system identifier, email address, or device identifier) indicative of a user of the client device 1010 on which the message 1300 was generated and from which the message 1300 was sent.
- A message receiver identifier 1324: an identifier (e.g., a messaging system identifier, email address, or device identifier) indicative of a user of the client device 1010 to which the message 1300 is addressed.

The contents (e.g., values) of the various components of the message 1300 may be pointers to locations in tables within which content data values are stored. For example, an image value in the message image payload 1306 may be a pointer to (or address of) a location within an image table 1208. Similarly, values within the message video payload 1308 may point to data stored within a video table 1210, values stored within the message annotations 1312 may point to data stored in an annotation table 1212, values stored within the message story identifier 1318 may point to data stored in a story table 1206, and values stored within the message sender identifier 1322 and the message receiver identifier 1324 may point to user records stored within an entity table 1202.

Figure 14:
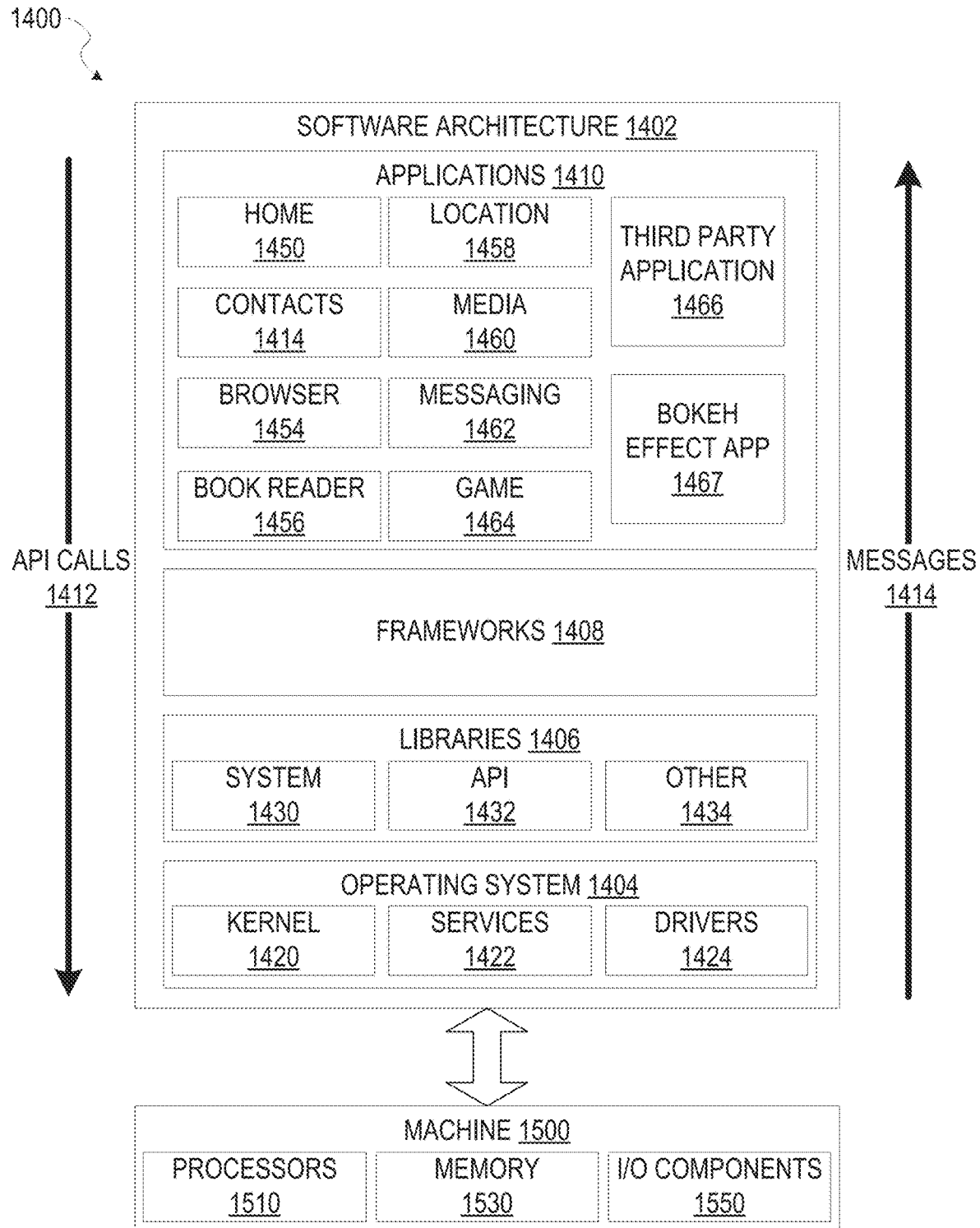
FIG. 14 is a block diagram illustrating an example of a software architecture that may be installed on a machine, according to some example embodiments.

FIG. 14 is a block diagram 1400 illustrating a software architecture 1402, which can be installed on any one or more of the devices described above. For example, in various embodiments, client devices 1010, server system 1008, and servers 1002, 1012, 1016, 1018, 1022, and 1024 may be implemented using some or all of the elements of the software architecture 1402. FIG. 14 is merely a non-limiting example of a software architecture, and it will be appreciated that many other architectures can be implemented to facilitate the functionality described herein. In various embodiments, the software architecture 1402 is implemented by hardware such as machine 1500 of FIG. 15 that includes processors 1510, memory 1530, and I/O components 1550. In this example, the software architecture 1402 can be conceptualized as a stack of layers where each layer may provide a particular functionality. For example, the software architecture 1402 includes layers such as an operating system 1404, libraries 1406, frameworks 1408, and applications 1410. Operationally, the applications 1410 invoke API calls 1412 through the software stack and receive messages 1414 in response to the API calls 1412, consistent with some embodiments.

In various implementations, the operating system 1404 manages hardware resources and provides common services. The operating system 1404 includes, for example, a kernel 1420, services 1422, and drivers 1424. The kernel 1420 acts as an abstraction layer between the hardware and the other software layers, consistent with some embodiments. For example, the kernel 1420 provides memory management, processor management (e.g., scheduling), component management, networking, and security settings, among other functionality. The services 1422 can provide other common services for the other software layers. The drivers 1424 are responsible for controlling or interfacing with the underlying hardware, according to some embodiments. For instance, the drivers 1424 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1406 provide a low-level common infrastructure utilized by the applications 1410. The libraries 1406 can include system libraries 1430 (e.g., C standard library) that can provide functions such as memory allocation functions, string manipulation functions, mathematic functions, and the like. In addition, the libraries 1406 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1406 can also include a wide variety of other libraries 1434 to provide many other APIs to the applications 1410.

The frameworks 1408 provide a high-level common infrastructure that can be utilized by the applications 1410, according to some embodiments. For example, the frameworks 1408 provide various graphic user interface (GUI) functions, high-level resource management, high-level location services, and so forth. The frameworks 1408 can provide a broad spectrum of other APIs that can be utilized by the applications 1410, some of which may be specific to a particular operating system 1404 or platform.

In an example embodiment, the applications 1410 include a home application 1450, a contacts application 1452, a browser application 1454, a book reader application 1456, a location application 1458, a media application 1460, a messaging application 1462, a game application 1464, and a broad assortment of other applications such as a third-party application 1466. According to some embodiments, the applications 1410 are programs that execute functions defined in the programs. Various programming languages can be employed to create one or more of the applications 1410, structured in a variety of manners, such as object-oriented programming languages (e.g., Objective-C, Java, or C++) or procedural programming languages (e.g., C or assembly language). In a specific example, the third party application 1466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1466 can invoke the API calls 1412 provided by the operating system 1404 to facilitate functionality described herein.

Some embodiments may particularly include a bokeh effect application 1467. In certain embodiments, this may be a standalone application that operates to manage communications with a server system such as third-party servers or server system 1008. In other embodiments, this functionality may be integrated with another application (e.g., messaging application 1462). The bokeh effect application 1467 may request and display various data related to messaging, media content, media collections, media overlays, and so forth, and may provide the capability for a user to input data related to the system via a touch interface, keyboard, or using a camera device of the machine 1500, communication with a server system via I/O components 1550, and receipt and storage of object data in memory 1530. Presentation of information and user inputs associated with the information may be managed by the bokeh effect application 1467 using different frameworks 1408, library 1406 elements, or operating system 1404 elements operating on a machine 1500.

Figure 15:
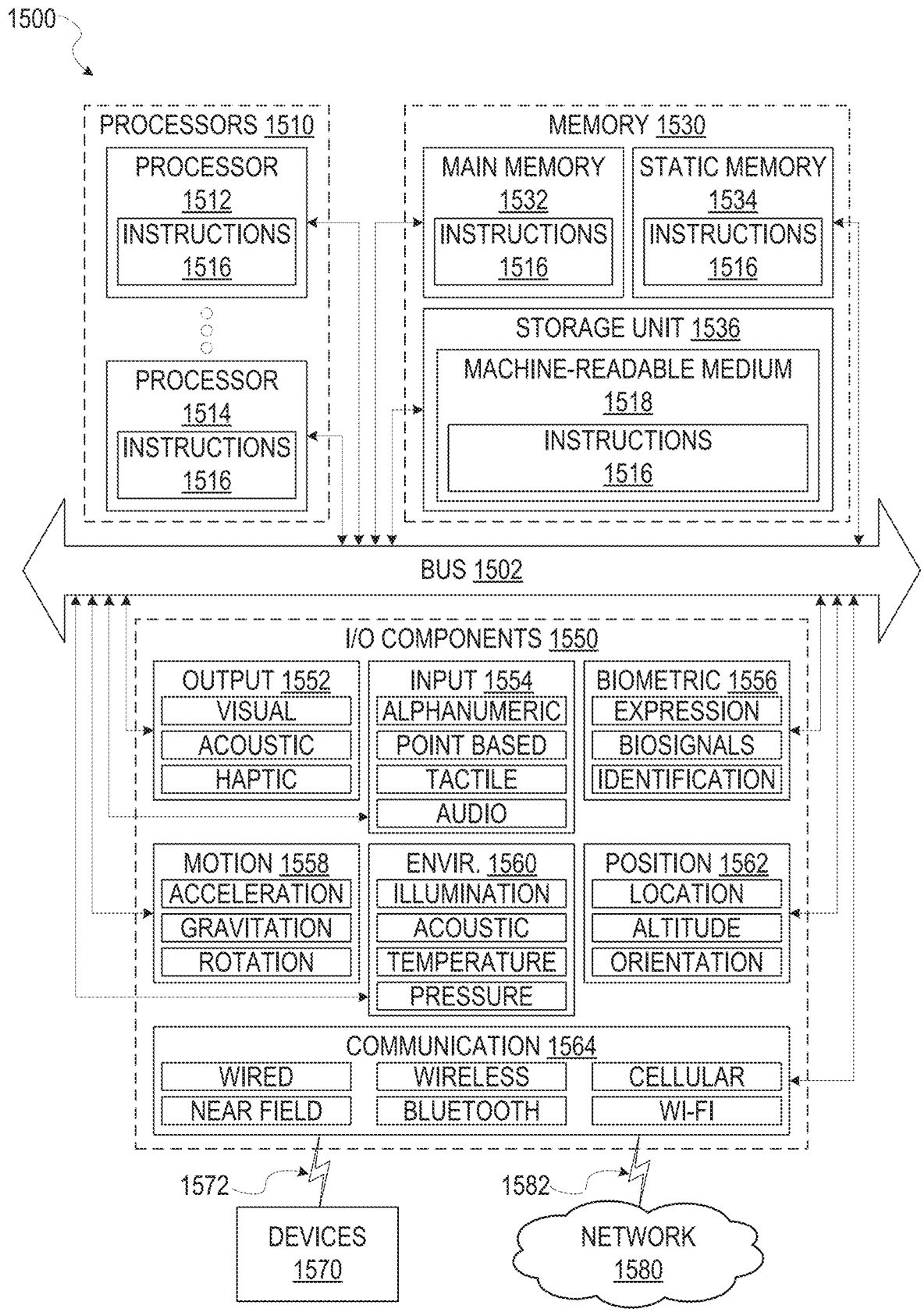
FIG. 15 illustrates a diagrammatic representation of a machine, in the form of a computer system, within which a set of instructions may be executed for causing the machine to perform any one or more of the methodologies discussed herein, according to an example embodiment.

FIG. 15 is a block diagram illustrating components of a machine 1500, according to some embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein can be executed. In alternative embodiments, the machine 1500 operates as a standalone device or can be coupled (e.g., networked) to other machines. In a networked deployment, the machine 1500 may operate in the capacity of a server machine 1008, 1012, 1016, 1022, 1024, and the like, or a client device 1010 in a server-client network environment, or as a peer machine in a peer-to-peer (or distributed) network environment. The machine 1500 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

In various embodiments, the machine 1500 comprises processors 1510, memory 1530, and IO components 1550, which can be configured to communicate with each other via a bus 1502. In an example embodiment, the processors 1510 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1512 and a processor 1514 that may execute the instructions 1516. The term "processor" is intended to include multi-core processors 1510 that may comprise two or more independent processors 1512, 1514 (also referred to as "cores") that can execute instructions 1516 contemporaneously. Although FIG. 15 shows multiple processors 1510, the machine 1500 may include a single processor 1510 with a single core, a single processor 1510 with multiple cores (e.g., a multi-core processor 1510), multiple processors 1512, 1514 with a single core, multiple processors 1512, 1514 with multiple cores, or any combination thereof.

The memory 1530 comprises a main memory 1532, a static memory 1534, and a storage unit 1536 accessible to the processors 1510 via the bus 1502, according to some embodiments. The storage unit 1536 can include a machine-readable medium 1518 on which are stored the instructions 1516 embodying any one or more of the methodologies or functions described herein. The instructions 1516 can also reside, completely or at least partially, within the main memory 1532, within the static memory 1534, within at least one of the processors 1510 (e.g., within the processor's cache memory), or any suitable combination thereof, during execution thereof by the machine 1500. Accordingly, in various embodiments, the main memory 1532, the static memory 1534, and the processors 1510 are considered machine-readable media 1518.

As used herein, the term "memory" refers to a machine-readable medium 1518 able to store data temporarily or permanently and may be taken to include, but not be limited to, random-access memory (RAM), read-only memory (ROM), buffer memory, flash memory, and cache memory. While the machine-readable medium 1518 is shown, in an example embodiment, to be a single medium, the term "machine-readable medium" should be taken to include a single medium or multiple media (e.g., a centralized or distributed database, or associated caches and servers) able to store the instructions 1516. The term "machine-readable medium" shall also be taken to include any medium, or combination of multiple media, that is capable of storing instructions (e.g., instructions 1516) for execution by a machine (e.g., machine 1500), such that the instructions 1516, when executed by one or more processors of the machine 1500 (e.g., processors 1510), cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1550 include a wide variety of components to receive input, provide output, produce output, transmit information, exchange information, capture measurements, and so on. In general, it will be appreciated that the I/O components 1550 can include many other components that are not shown in FIG. 15. The I/O components 1550 are grouped according to functionality merely for simplifying the following discussion, and the grouping is in no way limiting. In various example embodiments, the I/O components 1550 include output components 1552 and input components 1554. The output components 1552 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1554 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1550 include biometric components 1556, motion components 1558, environmental components 1560, or position components 1562, among a wide array of other components. For example, the biometric components 1556 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 include acceleration sensor components (e.g., accelerometer), gravitation sensor components, rotation sensor components (e.g., gyroscope), and so forth. The environmental components 1560 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1562 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 include a network interface component or another suitable device to interface with the network 1580. In further examples, communication components 1564 include wired communication components, wireless communication components, cellular communication components, near field communication (NFC) components, BLUETOOTH® components (e.g., BLUETOOTH® Low Energy), WI-FI components, and other communication components to provide communication via other modalities. The devices 1570 may be another machine 1500 or any of a wide variety of peripheral devices (e.g., a peripheral device coupled via a Universal Serial Bus (USB)).

Moreover, in some embodiments, the communication components 1564 detect identifiers or include components operable to detect identifiers. For example, the communication components 1564 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1564, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1580 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling 1582 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1516 are transmitted or received over the network 1580 using a transmission medium via a network interface device (e.g., a network interface component included in the communication components 1564) and utilizing any one of a number of well-known transfer protocols (e.g., Hypertext Transfer Protocol (HTTP)). Similarly, in other example embodiments, the instructions 1516 are transmitted or received using a transmission medium via the coupling 1572 (e.g., a peer-to-peer coupling) to the devices 1570. The term "transmission medium" shall be taken to include any intangible medium that is capable of storing, encoding, or carrying the instructions 1516 for execution by the machine 1500, and includes digital or analog communications signals or other intangible media to facilitate communication of such software.

Furthermore, the machine-readable medium 1518 is non-transitory (in other words, not having any transitory signals) in that it does not embody a propagating signal. However, labeling the machine-readable medium 1518 "non-transitory" should not be construed to mean that the medium is incapable of movement; the medium 1518 should be considered as being transportable from one physical location to another. Additionally, since the machine-readable medium 1538 is tangible, the machine-readable medium 1518 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, by a mobile device comprising a central processing unit (CPU) and a graphics processing unit (GPU), an image from a camera of the mobile device;
   analyzing, by the CPU of the mobile device, the image to determine a subject of the image;
   segmenting, by the CPU of the mobile device, the subject of the image to generate a mask indicating an area of the image comprising the subject of the image separate from a background region of the image;

for each pixel of a plurality of pixels of the background region, performing operations by the GPU of the mobile device, at the same time in parallel for each pixel, comprising:
    traversing a predefined area corresponding to a custom shape surrounding the pixel to determine a pixel color value for each pixel surrounding the pixel;
    retrieving the pixel color value for each surrounding pixel; and
    generating a blurred value for the pixel based on the pixel color value for each surrounding pixel;
applying, by the GPU of the mobile device, a bokeh effect comprising the custom shape to the background region of the image to generate a processed background region using the blurred value for each pixel of the plurality pixels based on the custom shape;
generating, by the mobile device, an output image comprising the subject of the image and the processed background region; and
causing, by the mobile device, the generated output image to display on a display of the mobile device.

2. The method of claim 1, wherein analyzing the image to determine a subject of the image comprises detecting a face in the image and wherein the segmenting and following operations are only performed upon detecting the face.

3. The method of claim 1, wherein the image is a frame of a video.

4. The method of claim 1, wherein the segmenting the subject of the image to generate a mask of the subject of the image comprises applying Deep Neural Network-based portrait segmentation to generate a mask of a portrait as the subject of the image.

5. The method of claim 1, further comprising:
blending each blurred value for each pixel of the plurality of pixels that belongs to the background region of the image, with the subject of the image.

6. The method of claim 1, wherein generating an output image comprising the subject of the image and the processed background region, further comprises:
    adjusting a brightness of the processed background region by analyzing each pixel value in each of a predetermined shape area to determine whether brightness of the pixels should be increased.

7. A mobile device comprising:
a memory that stores instructions; and
one or more hardware processors comprising a central processing unit (CPU) and a graphics processing unit (GPU) and configured by the instructions to perform operations comprising:
receiving an image from a camera of the mobile device;
analyzing, by the CPU of the mobile device, the image to determine a subject of the image;
segmenting, by the CPU of the mobile device, the subject of the image to generate a mask indicating an area of the image comprising the subject of the image separate from a background region of the image;
for each pixel of a plurality of pixels of the background region, performing operations by the GPU of the mobile device, at the same time in parallel for each pixel, comprising:
    traversing a predefined area corresponding to a custom shape surrounding the pixel to determine a pixel color value for each pixel surrounding the pixel;
    retrieving the pixel color value for each surrounding pixel; and
    generating a blurred value for the pixel based on the pixel color value for each surrounding pixel;
applying, by the GPU of the mobile device, a bokeh effect comprising the custom shape to the background region of the image to generate a processed background region using the blurred value for each pixel of the plurality pixels based on the custom shape;
generating an output image comprising the subject of the image and the processed background region; and
causing the generated output image to display on a display of the mobile device.

8. The mobile device of claim 7, wherein the image is a frame of a video.

9. The mobile device of claim 7, further comprising:
blending each blurred value for each pixel of the plurality of pixels that belongs to the background region of the image, with the subject of the image.

10. The mobile device of claim 7, wherein generating an output image comprising the subject of the image and the processed background region, further comprises:
    adjusting a brightness of the processed background region by analyzing each pixel value in each of a predetermined shape area to determine whether brightness of the pixels should be increased.

11. A non-transitory computer-readable medium comprising instructions stored thereon that are executable by at least a central processing unit (CPU) and a graphics processing unit (GPU) to cause a mobile device to perform operations comprising:
receiving an image from a camera of the mobile device;
analyzing, by the CPU of the mobile device, the image to determine a subject of the image;
segmenting, by the CPU of the mobile device, the subject of the image to generate a mask indicating an area of the image comprising the subject of the image separate from a background region of the image;
for each pixel of a plurality of pixels of the background region, performing operations by the GPU of the mobile device, at the same time in parallel for each pixel, comprising:
    traversing a predefined area corresponding to a custom shape surrounding the pixel to determine a pixel color value for each pixel surrounding the pixel;
    retrieving the pixel color value for each surrounding pixel; and
    generating a blurred value for the pixel based on the pixel color value for each surrounding pixel;
applying, by the GPU of the mobile device, a bokeh effect comprising the custom shape to the background region of the image to generate a processed background region using the blurred value for each pixel of the plurality pixels based on the custom shape;
generating an output image comprising the subject of the image and the processed background region; and
causing the generated output image to display on a display of the mobile device.

12. The method of claim 1, wherein the custom shape is a circle, star, or heart shape.

13. The method of claim 1, wherein the image is a frame of a video, and further comprising:
applying the bokeh effect to each of a plurality of key frames of the video and filling gaps in between key frames based on tracking of the subject of the image in each frame of a gap between key frames.

14. The method of claim 1, wherein the mobile device is a first mobile device and further comprising:
generating a message comprising the generated output image; and
sending the generated message to a second mobile device.

15. The method of claim 1, wherein generating the blurred value comprises:
   generating a color value for the pixel and a number of pixels that have been added to the color value; and
   normalizing the color value by the number of pixels that have been added to the color value, to generate the blurred value.

16. The method of claim 1, wherein the image is received before the image is captured as a photograph or video by the camera of the mobile device.

17. The method of claim 1, wherein a fragment shader inside the GPU of the mobile device is used to apply the bokeh effect.

18. The method of claim 1, further comprising:
   generating an ephemeral message comprising the generated output image and a caption generated by a user of the mobile device; and
   adding the generated ephemeral message with the caption to a media collection to be provided upon request from other mobile devices.

19. The mobile device of claim 7, wherein generating the blurred value comprises:
   generating a color value for the pixel and a number of pixels that have been added to the color value; and
   normalizing the color value by the number of pixels that have been added to the color value, to generate the blurred value.

20. The mobile device of claim 7, wherein a fragment shader inside the GPU of the mobile device is used to apply the bokeh effect.

\* \* \* \* \*